United States Patent [19]

Penny et al.

[11] Patent Number: 4,518,254

[45] Date of Patent: May 21, 1985

[54] OCEAN DEPTH SOUNDING FROM THE AIR BY LASER BEAM

[75] Inventors: Michael F. Penny, Salisbury Heights; Brian Woodcock, Banksia Park; Ralph H. Abbot, Walkerville; David M. Phillips, Tea Tree Gully; Leendert B. Spaans, Hawthorndene, all of Australia

[73] Assignee: The Commonwealth of Australia, Canberra, Australia

[21] Appl. No.: 385,398

[22] PCT Filed: Sep. 21, 1981

[86] PCT No.: PCT/AU81/00137

§ 371 Date: May 18, 1982

§ 102(e) Date: May 18, 1982

[87] PCT Pub. No.: WO82/01075

PCT Pub. Date: Apr. 1, 1982

[30] Foreign Application Priority Data

Sep. 22, 1980 [AU] Australia ............... PE5680/80

[51] Int. Cl.³ .................................. G01C 3/08
[52] U.S. Cl. ..................................... 356/5; 356/4
[58] Field of Search ........................... 356/4, 5

[56] References Cited

U.S. PATENT DOCUMENTS 3,523,730  8/1970  Hayek et al. .................. 356/4
3,533,697  10/1970  Hughes .
3,604,803  9/1971  Kahn .
4,050,819  9/1977  Lichtman .
4,277,167  7/1981  Eppel .......................... 356/5

FOREIGN PATENT DOCUMENTS 488231  10/1976  Australia .
1339358  12/1973  United Kingdom .

OTHER PUBLICATIONS

C. A. Levis et al., Conference: Ocean 1973, IEEE Int'l. Conf. on Engineering in the Ocean Environment, Seattle, Wash., 25–28, Sep. 1973, 356/4, p. 76.
Japan, A, 55-31962 (Nippon Denki K.K.) Mar. 6, 1980, (06.03.80), (JAPATIC English language abstract).

Primary Examiner—S. C. Buczinski
Attorney, Agent, or Firm—Cushman, Darby & Cushman

[57] ABSTRACT

A system of ocean depth sounding from the air which consists in projecting an infrared beam (2) down normal to the ocean surface along a forward travel path to backscatter a signal to a receiver (10) to measure distance to the ocean surface, and simultaneously projecting down a green beam (1) to sweep across the direction of travel to backscatter a series of signals from the ocean bottom over an extended width to a second receiver (11), adjusting the receiver gain from the green signal to achieve optimum ocean bottom measurement and calculating ocean depth from the infrared and green signal differential.

22 Claims, 14 Drawing Figures

OCEAN DEPTH SOUNDING FROM THE AIR BY LASER BEAM

This invention relates to a method of, and means for, ocean depth sounding from the air.

This invention relates particularly to the laser beam geometry, the use of a dual wavelength for ocean bottom and ocean surface reflection, a scanner for beam control, receiver for the reflected subsurface signal and torque motor for platform stabilization.

Features of the invention will be appreciated from the following description but it should be clear that variations within the spirit of the invention are possible and the following description is not to be considered limiting.

The basis of the invention is the use of an airborne station which propagates two laser beams, one of which has a wavelength in the infrared spectrum and is held normal to the ocean surface to give principally a surface reflection, and the other is a transversing beam operating at right angles to the direction of travel of the station with a wavelength in the green to give principally a bottom reflection. Features of the invention are the method of compensation for the additional airpath traversed by the green beam because of the scanning action, and the use of a scanning mirror to scan both a laser beam and the field of view of the receiver to yield an orthogonal pattern of soundings.

A feature of the invention is the receiver means which detect laser light reflected from the surface, water column and the bottom through a telescope and is arranged to discriminate bottom reflections against surface reflection and sunlight and other unwanted relfections, and has a sufficient dynamic range to allow for both varying reflection coefficients of the sea bottom and varying attenuation of the green beam with depth.

Generally the method comprises the steps of directing two laser beams of different wavelengths downwardly from an aircraft, the one a stable vertical beam in the infrared wavelength which reflects back from the ocean surface to allow the distance from the aircraft of the ocean surface to be calculated, the other a beam in the green wavelength which penetrates the ocean surface and is reflected back from the ocean bottom to allow the distance of the ocean bottom from the aircraft to be calculated, the said green beam being traversed transversely of the direction of travel of the aircraft the two beams being preferably but not necessarily produced from one laser by passing the infrared beam through a frequency doubler to generate the green beam and using the residual signal as the infrared beam.

To enable the invention to be fully appreciated, reference will be made to the accompanying drawings in which.

Note that throughout this document the words green and infrared are sometimes used as adjectives to described equipment: in this sense they describe the wavelength of the laser light with which that equipment receives, detects or in any way is associated.

Figure 1:
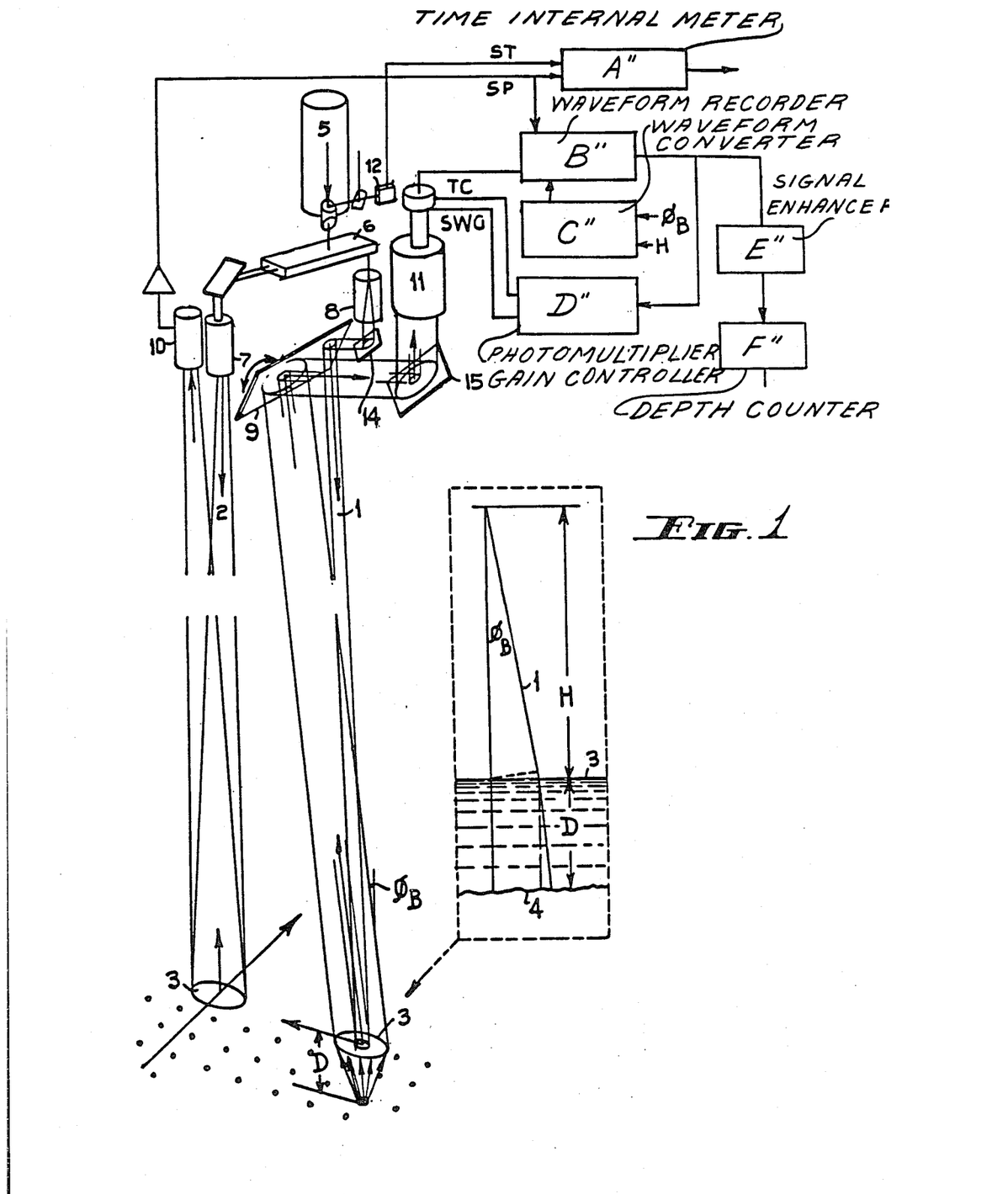
FIG. 1 is a schematic perspective view showing the system in general using a single laser and coupler to produce the infrared and the green beams, showing in block diagram form the basic system and showing in the dotted rectangle the scanning geometry of the green beam.

In FIG. 1 the green traversing beam is indicated by 1 and the vertically stable infrared beam is indicated by 2. The infrared beam 2 is reflected from the ocean surface 3 while the green beam is reflected from the ocean bottom 4. H represents the aircraft height above the ocean surface, while $\phi_B$ is the absolute inclincation of the green laser beam. D is the depth of the ocean.

In the block diagram A" is the time interval meter, B" the waveform recorder, C" the waveform converter, D" the photomultiplier gain controller (PMGC), E" a signal enhancer and F" the depth counter.

The laser 5 directs the infrared beam to the coupler 6 which directs the infrared beam to the transmitter 7, the grean beam being transmitted via 8 to the ocean through the scanner mirror 9. 10 represents the infrared telescope and 11 the green telescope. 12 represents the pulse start photodetector. SWG represents shallow water gain, and TC the time constant, both connected to the photomultiplier gain controller D". ST=Start, SP=Stop.

Figure 2:
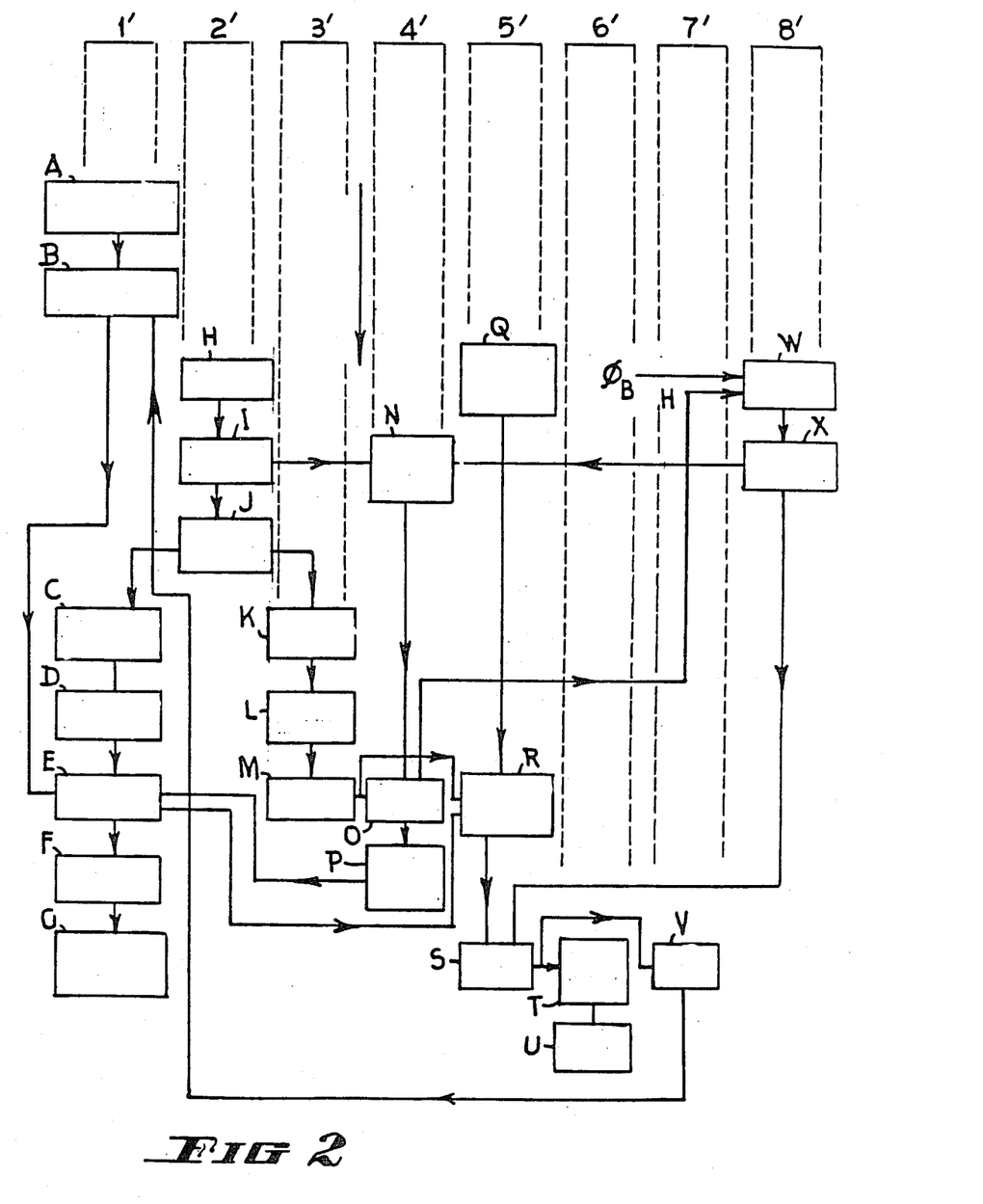
FIG. 2 is a flow chart in block diagram form to show the sequential processing of a measuring pulse.

In the flow chart designated FIG. 2 the block diagram generally shows the processing of the signals from just before the laser fires, the block diagram showing the various stages in the horizontal numbering and the signal processing in a timewise manner vertically downward.

The various integers of the block diagram represent the following:

Reading Horizontally
1'=Green channel
2'=Laser
3'=Infrared channel
4'=Height counter (time interval meter)
5'=Waveform recorder 6' = Signal Enhancer and Depth Counter
7' = Photomultiplier Gain Controller
8' = Waveform Converter Reading Down A. Green Receiver—measures background radiation and sets deep water gain.

B. Green Receiver—gain reduced to shallow water level determined by PMGC.

C. Green pulse transmitted vertically down to sea surface.

D. Green Pulse reflected from sea surface, backscattered from water column and reflected from sea bottom.

E. Photomultiplier gain increases as surface reflection enters.

F. Photomultiplier gain increases with time constant $\tau$ determined by PMGC.

G. Photomultiplier gain reaches maximum deep water gain and after a delay reduces to a very low 'off' value.

H. Laser fires and produces pulse of mixed green and infrared light.

I. Start monitor produces 'start' signal as laser pulse produced.

J. Coupling unit separates infrared and green pulses.

K. Infrared pulse transmitted vertically down to sea surface.

L. Scattered infrared pulse from surface collected in infrared telescope.

M. Infrared photo detector produces stop pulse.

N. Time interval meter starts counting up 300 MHz pulses and counting down slant height.

O. Time interval meter stops counting 300 MHz pulses. Count represents height H in 0.5 m.

P. Slant height counter reduces to zero. Presurface pulse produced.

Q. Waveform recorder armed.

R. Waveform recorder triggered and starts recording green signal.

S. Waveform recorder replays under control of waveform converter.

T. Signal enhancer filters replay green signal

U. Depth counter measures depth.

V. PMGC computes shallow water gain ($g_2$) and time constant $\tau$.

W. Waveform converter reads previous H and real $\phi_B$.

X. Waveform converter computes path delay for current transmitted pulse and slant height for next transmitted pulse.

From the above chart the various sections and their interrelationship can be seen, time being indicated stepwise in a downward direction.

The sequence will now be described in more detail.

The first action is the photomultiplier in the green receiver 11 increasing its gain gradually until it detects an output (due to background sun and sky illumination) which is just below a predetermined threshold level. The maximum gain is then set at that level, and the gain then reduced to a level determined from the previous pulse based on backscatter reflection from the water column just below the sea surface.

The laser 5 produces an extremely short (five nanosecond) pulse of infrared radiation which is passed through a frequency doubling crystal to convert some of the infrared radiation into green radiation of wavelength 532 nm. The output of the laser is thus a pulse of mixed infrared and green radiation, which is passed into a coupling 6 in which the two different wavelengths are spectrally separated so that they can be directed through separate beam expanding telescopes 7 and 8.

This action of the laser is repeated at a rate of 168 pulses per second, however the following description is written generally for a single laser pulse, except when discussing the action of the scanning mirror 9 and the production of a pattern of green laser pulses on the sea surface—each pulse resulting from a separate action of the laser.

A small portion of the outgoing laser pulse is sampled with a photo detector 12 to produce an electrical pulse which indicates the precise time at which the laser pulse is transmitted. This electrical pulse is called the START pulse and is fed to the aircraft height counter or time interval meter A''.

The infrared beam pulse 2 is transmitted vertically to the sea surface beneath the aircraft, where a portion of it is reflected. The telescope 10 in the aircraft is arranged to view the surface of the sea illuminated by the infrared pulse and a fraction of the infrared reflection is presented on a photo-sensitive diode surface which produces an electrical pulse called the STOP pulse to provide a timing datum for both aircraft height measurement and sea depth measurement. The time interval meter A'' is used to measure with precision the time interval between the START and STOP signals, and thus the height H of the aircraft above the sea surface.

The green pulse 1 is transmitted via fixed mirror 14 (inclined at 45° to the vertical) onto the mirror 9 which is oscillating in such a manner as to transverse the green beam laterally across the flight path of the aircraft. This mirror is oscillated to a lesser extent along the flight path of the aircraft and the combined motion produces an orthogonal pattern of laser spots on the surface of the sea as shown by the dots in FIG. 1.

A telescope 11 is arranged to look via a fixed 45° mirror 15 on to the same oscillating mirror which scans the green laser spots and hence onto the same portion of sea surface illuminated by the green laser light. The output from this telescope passes through a variable field stop, which limits its field of view from between 4 mr to 40 mr. In the centre of the field of view is a block, which can be set at 0 mr, 1 mr, 1.5 mr, 2 mr, 4 mr, 6 mr, and 10 mr, and is used to obscure as much of the incident surface reflection as is possible, and hence reduce the dynamic range of the received green signal. The reflected green light then passes through a polarizing filter which is adjusted so as to further reduce the intensity of the incident surface reflection. This is possible since the laser light is linearly polarized as a consequence of the laser design. Finally a narrow-band temperature-controlled interference filter is used to pass the received green laser light and to block as much a possible of the reflected sun and sky radiation this general assembly not being illustrated as such components form part of the general art.

A photomultiplier is used to convert the optical output of the green receiving telescope and filters into an electrical signal which is the sum of four essential components viz, (a) reflection from the sea surface which can be very intense and is extremely variable, (b) backscatter component from the bulk of the water—this component decreases essentially exponentially with depth (and hence time), (c) reflection from the bottom and (d) background noise due to reflected sun and sky radiation.

The photomultiplier gain is varied to enhance the detection of a bottom signal. A control dynode close to the photocathode is used to cut the tube off completely during the time between the laser pulses: this allows the tube to be operated at high gain at the time of the expected laser return without damaging the tube. A group of dynodes near the centre of the dynode chain is used to increase the gain of the tube during the time that a bottom pulse is expected. The gain is increased smoothly from the level which produces a detectable output (below a predetermined threshold) from the backscatter of the water just below the surface to a maximum gain level which produces an output due to background noise (sun and sky) which is also just below the threshold. The timing of this gain increase is such that it starts at the time of the expected surface reflections, increases to the maximum level established before the laser fired at a rate designed to maintain the output due to the exponentially decreasing backscatter from the water column at a constant level which is just below threshold. After a fixed period following the laser firing, both gain controls return to their low preset "cut-off" levels.

The electrical output of the photomultiplier (GREEN SIGNAL) is then presented to a digitizing waveform recorder B" which digitizes the GREEN SIGNAL into 6 bit words every two nanoseconds and stores 1024 such words in a memory. The recording process is continuous from the time the recorder is armed (with an ARM signal) until 1000 two nanosecond increments after the receipt of the trigger (called the STOP signal, an output of the infrared receiver 10).

Once the recording process is complete, the data stored in memory is replayed at a much slower rate under control of a microprocessor based system called a waveform converter C". Essentially this computes the delay as a result of the extra path travelled by the scanned green pulse with respect to the vertical infrared pulse. To do this it takes the aircraft height H, as measured by the time interval meter, and the scan angle relative to the vertical, $\phi_B$ and computes $\Delta = 3.3H(\text{Sec}\phi_B - 1) + N$, where N represents relative delays in the electronics between the two receivers and $\Delta$ is the number of words in memory which must be output such that the replayed waveform commences at a time representing a position effectively 5.0 m before the expected position of the surface reflection. It then commands the waveform recorder to output this number at high speed (1.4 MHz), and the data contained within is dumped. Then 267 words are commanded to be output at 50 KHz word rate which enables the data to be recorded. The 267 words correspond with a depth A of approximately 60 m. The remainder of the 1024 words are commanded to be output at the high rate and the contents dumped. The waveform recorder is then rearmed ready for the next laser pulse.

The waveform converter also calculates the slant height of the scanned beam, based on H slant = H sec$\phi$ − dh, (where dh represents a small distance above the sea surface at which the photomultiplier gain is to be commanded to increase) and presents the result to the time interval meter.

At the instant of the START pulse the time interval meter commences to count the slant height down to zero at which time it produces a PRESURFACE pulse. This PRESURFACE pulse is used to initiate the increase in photomultiplier gain from the shallow water level to the deep water level.

The output of the waveform recorder is available to and read by the photomultiplier Gain Controller (PMGC), D". This microprocessor based system determines (from the amplitude of the backscatter component at a shallow depth in the water column and the measured gain of the photomultiplier) the gain required for shallow water and the rate at which it should increase with depth as described before.

A digital to analogue converter in the waveform recorder produces an analogue output signal which is a reproduction of the output of the photomultiplier but is 10,000 times slower and can be more easily displayed and processed, and recorded. A high pass filter is used in the Signal Enhancer E" to remove the relatively slow backscatter component from the signal.

This filtered version of the signal is then presented to a Depth Counter F" which measures the time interval between the reference timing datum (effectively 5.0 m above the sea surface) and any bottom signal which occurs after a time determined by a Range Gate and which exceeds a predetermined Threshold. This time interval is thus a measure of the depth of the sea (adjusted for the 5.0 m extra depth).

The entire optical components of the system are mounted on a Drift platform which rotates so that the acrosstrack scan motion is normal to direction of flight; on a Roll platform which is gyro stabilized to maintain verticality of the infrared transmissions in the roll sense, and on a Pitch patform which is manually adjusted to maintain verticality similarly in the pitch sense.

The stabilization of the Roll platform is maintained using a vertical gyroscope, the roll output of which is used to drive a torque motor which directly drives the Roll platform. This permits the natural inertia of the Roll platform to assist maintain a stabilized mount, and only deviations from the desired verticality of the infrared beam are used to drive the torque motor.

The true angle ($\phi_B$) of the scanned green beam relative to the vertical is the sum of the angle of the scanned beam relative to the Roll platform (produced by the major scan transducer) and the angle of the Roll platform relative to the horizontal (detected by the gyroscope). It is this composite angle which is digitized by the Scan A/D (at the time of the laser firing) and used in the computation in the Waveform Converter of the airpath delay due to beam angle.

THE SYSTEM AND BEAM GEOMETRY

From the above it will be realised that in order to measure sea depth from an aircraft using a laser beam, a time interval must be recorded, i.e. the elapsed time between reflection of the beam from the sea surface and reflection for the bottom. The method relates to measuring the specified time interval in a mode of operation where the laser beam is scanned transversely, across the track of the aircraft to generate an area of depth soundings, using as said a green traversing beam 1 and infrared vertical surface beam 2 as shown particularly in FIGS. 1 and 2.

As referred to earlier herein the infrared vertically stabilised laser beam 2 is reflected from the surface 3 of the sea to generate a timing datum for depth measurements. The technique permits, with suitable instrumentation, the integration of returned signals to establish a mean sea level datum. Integration can be applied for a short period (i.e. 1 or 2 seconds) when aircraft height can be considered constant, or for a longer period over which vertical motion of the aircraft, measured by separate instrumentation, is taken into account.

The transversely scanned component of the laser beam propagates through the water column, is diffusely reflected from the bottom, 4, propagates upward through the water column, is then subject to refraction at the surface, and a small component of the reflected laser energy is received at the aircraft. A position fixing signal is used, indicating the aircraft position and the flight path.

At beam inclinations away from the vertical the need arises for compensation of the additional airpath traversed by the scanned component of the laser beam. This correction is $H(\sec\phi_B - 1)$ where H is the aircraft height above the sea and $\phi_B$ is the absolute inclination of the laser beam.

Figure 3:
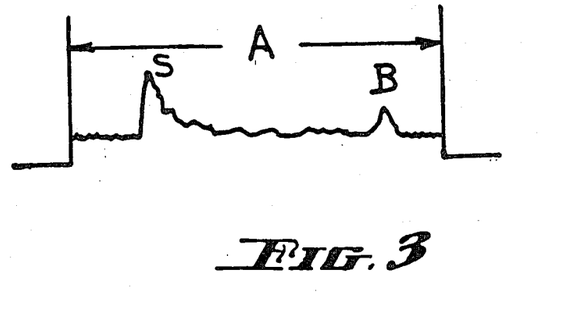
FIG. 3 shows the format of the green return signal, S indicating the ocean surface pulse and B the ocean bottom pulse.

This function is carried out by a microprocessor system the output of which controls the presentation of data in the format shown in FIG. 3 where B represents the bottom signal. In this A indicates the depth measuring range of system, B indicating the bottom signal, S the surface signal. The word format can be as shown at the lower part of FIG. 3. Note that the reference timing edge C occurs 5.0 m before expected surface return.

The parameter H is obtained from a 300 MHz counter which measures aircraft height above the sea with a single shot resolution of 0.5 meters. Beam inclination $\phi_B$ is also available as a measured parameter.

The wavelength of laser energy propagated through a water column must be in the blue green band. It follows therefore that the frequency doubled component of a Nd:YaG laser at a wavelength of 532 nm should be used for this task. The frequency doubling process, i.e. the conversion of infrared energy at 1064 nm to energy at 532 nm (green) is inefficient and a residual infrared component remains after the process. It is this infrared component which is used to sense the sea surface.

The laser rod used is preferably 3 mm diameter and is positioned in a cavity having a mirror of total reflection at one end and a mirror of low reflectivity at the other end to pass about 90% of the signal. The laser is designed to minimise heating problems in the laser rod and flash lamp and to allow high energy output.

THE SCANNER

The scanning mirror, in this instance used to scan a laser beam and the field of view of a receiver, is used to place on the ocean an orthogonal trace of soundings. Provided laser pulse rate and scanning frequency are adjusted in accordance with ground speed, a square matrix of depth soundings is generated.

Figure 4:
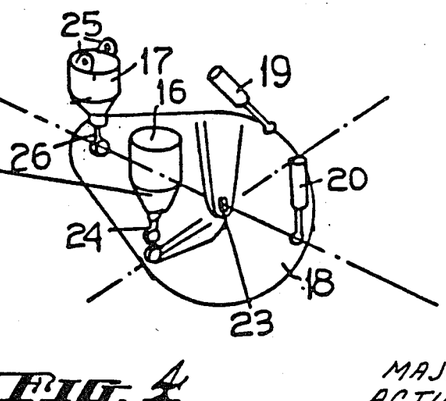
FIGS. 4 and 5 show schematically a mirror assembly for directing the scanning beam and receiving the back-reflected signal.
Figure 5:
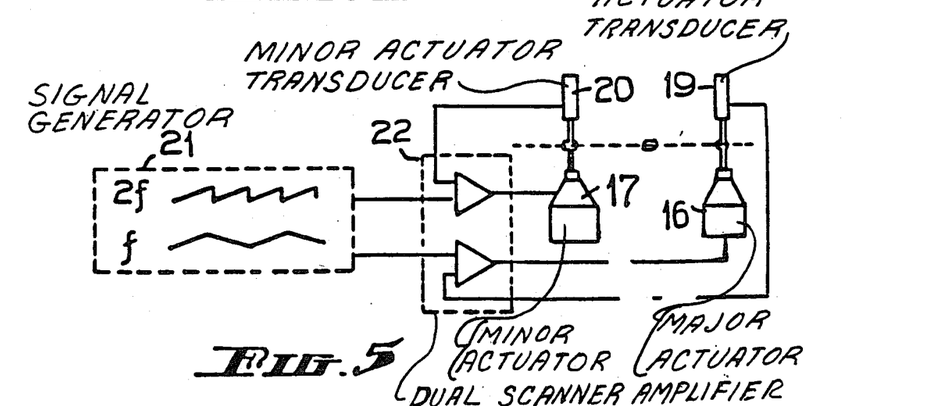

The scanner, shown in FIG. 4 in conjunction with FIG. 5 which shows the signal generator and amplifiers, comprises a major actuator 16, a minor actuator 17, a scanning mirror 18, a major actuator transducer 19, a minor actuator transducer 20, a signal generator 21 and a dual scanner amplifier 22.

The operation of the scanner, using a single ball joint mount 23, approximates a gimbal system. For a given laser beam deflection $\phi$ the required mirror inclination is $\frac{1}{2}\phi$. Thus, for small angle variation of the laser beam the mirror angles are small and the coupling from one orthogonal axis to another is correspondingly small.

The assembly is mounted in a stable configuration free from mechanical constraints (6 degrees of freedom fixed) by using the major actuator 16 with a connecting rod 24 with two ball jointed ends and by pivoting the minor actuator 17 on its base by a trunion mount 25 with one ball jointed rod end 26 at its point of application. This is not illustrated as stabilizing devices are known in the art.

The scanner can be operated in a fixed configuration to provide a nominally square pattern of depth soundings under zero wind conditions. In the event distortion of the pattern due to wind can be determined and accepted.

THE RECEIVER

The purpose of the receiver is as follows:

(a) To detect laser light reflected from the sea bottom resulting from the illumination of the bottom by a laser beam.

(b) To discriminate bottom reflection signals against surface reflections caused by the laser beam, backscatter of laser light in bulk water and reflected sun and sky light.

(c) To provide an adequate dynamic range of detection to cater for bottom reflections which vary significantly due to varying coefficients of the sea water and bottom and more importantly, varying depth.

The principle followed, for convenient and efficient detection of bottom reflections, is to modify the gain of the detector, (a photomultiplier) over the time gate when bottom reflections can be anticipated.

The relevant inventive features are:

(i) The method of achieving "programmed gain control" of the photomultiplier detector to provide extremely fast control of gain and change of gain over the time gate, when bottom signals can be expected.

(ii) The method and principle used in controlling the gain for the deep water case.

(iii) The method and principle used for controlling the gain in the shallow water case.

The invention preferably comprises a telescope and a selected focal length, say 1100 mm, and an effective aperture of say 250 mm, and incorporating a number of preselectable field-stops which attenuate the direct surface reflections, and an interference type filter centred on 532 nm to ensure a good signal-to-noise figure. The field can be adjusted to between 4 and 40 mrad with centre field stops ranging from 0 to 10 mrad.

The detector head, employing a 14-stage photomultiplier, incorporates a control grid, enabling the tube to be switched on only during the interval from time of transmission until the return signals have been received. With this mark/space ratio of approximately 1:1000, it is possible to operate the tube at greater peak anode currents than would otherwise be the case.

To achieve the wide dynamic range of gain necessary (in order of $10^4:1$), a number of dynodes in the later stages of the photomultiplier are controlled, in such a manner as to effectively change it from an optimised 14-stage configuration to a configuration where the tube is virtually cut-off.

Figure 6:
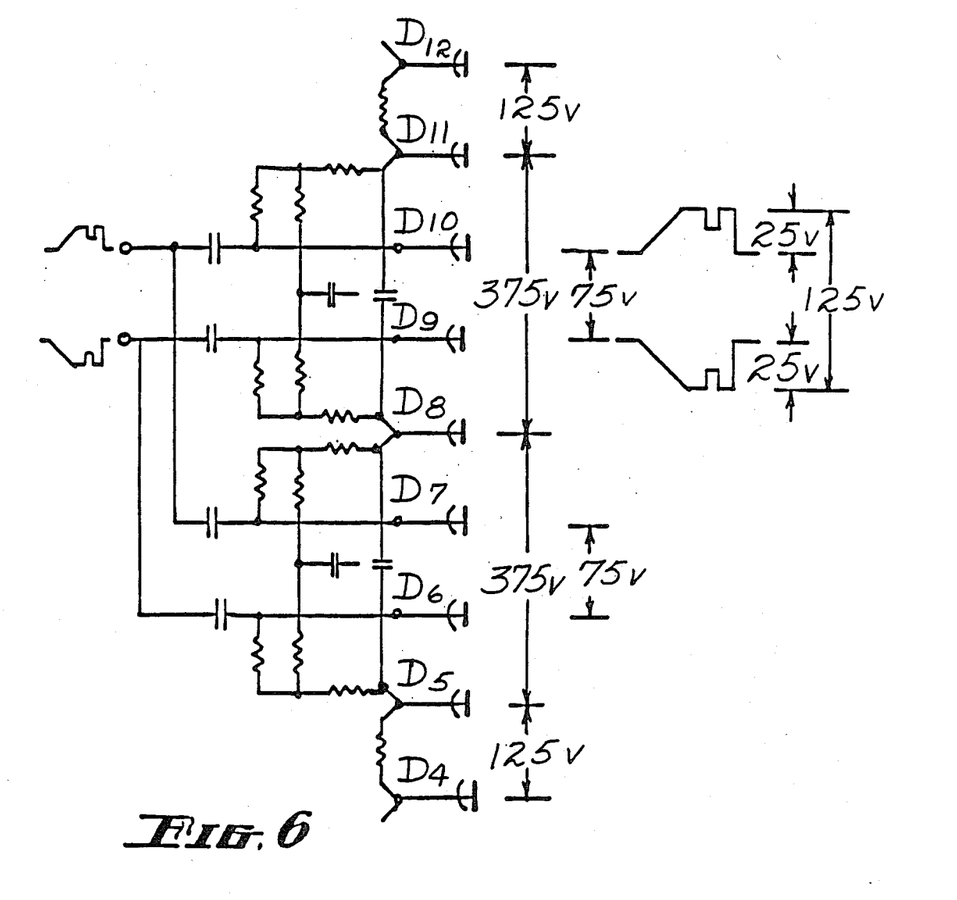
FIG. 6 shows the photomultiplier gain control.

By means of the configuration shown in FIG. 6, selected adjacent pairs of dynodes are controlled from a time variable voltage generator in a symmetrically opposed manner, this manner being selected so as to minimise noise coupling in the photomultiplier. The amplitude of these signals are such that the photomultiplier is progressively turned on as the potential increases between dynodes D6-7 and D9-10.

When this potential reaches that which exists between D4-5 and D9-10, a linear arrangement exists between all dynodes and the photomultiplier exhibits maximum gain.

The time variable voltage generator employs a number of power MOS FETS in order to achieve the fast switching times required. The maximum amplitude of the voltage swing is related to the E.H.T. on the photomultiplier, which in turn controls the dynamic range of the detector system.

Changing the E.H.T. alone to control the required gain would result in a transit time varying inversely proportional to half power of the applied E.H.T. With the method employed the transit time remains constant at approximately 50 nS. The spread in anode pulse width is kept to a minimum by maintaining a constant voltage between the cathode and first dynode.

In deep water in daylight, reflected sky and sunlight constitutes a limiting noise source. In this case the background energy entering the receiver is assessed a few microseconds before the laser is operated. The gain of the receiver is adjusted by means of servo action to amplify the background sunlight to a specific level. This predetermined gain is then applied to the photomultiplier at that part of the receiver time gate when deep bottom signals are expected.

The predominating noise in shallow water is backscatter induced by the laser beam. The receiver which measures this backscatter is described later herein. This part of the receiver which is microprocessor controlled achieves the following:

(a) Backscatter is measured for each laser transmission.

(b) Optimised averaging processes are used to predict optimum gain settings for the photomultiplier in the shallow depth section of the receiver time gate.

(c) Water turbidity can be estimated from the backscatter measurements. This permits the prediction of maximum depth sounding capability of the system.

(d) By analysing the relative timing of surface reflections, the verticality of the scanning system can be estimated.

The part of the receiver which optimises the photomultiplier gain for signals from shallow water, is described with reference to FIGS. 7 to 14.

The principle of operation is to control the gain of the photomultiplier used to detect the green return signal; that it reduces the dynamic range of the signal to optimise the detection of the bottom.

Figure 7:
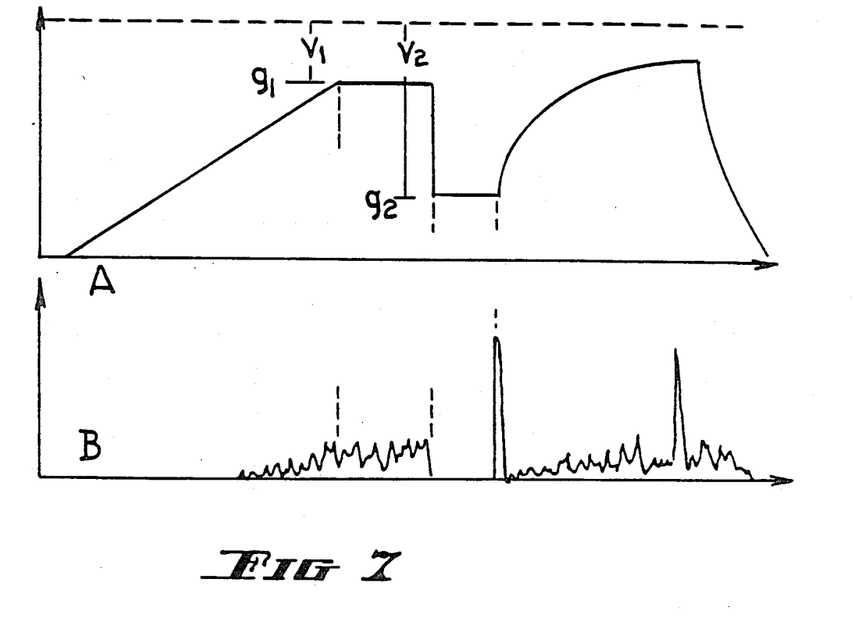
FIG. 7 shows the effect of the time variable gain control of the photomultiplier on the anode signal current, A showing the dynode voltage, B showing the anode signal current.

The time variable gain of the photomultiplier is illustrated schematically in FIG. 7. About 15 $\mu$s before each laser pulse is expected the gain of the photomultiplier is increased until the anode noise current reaches a predetermined value. This is achieved by controlling the voltage between two adjacent dynodes in the photomultiplier. When the noise current reaches the set value the dynode voltage stops rising and thus the gain ($g_1$) is held constant until about 3 $\mu$s before the return signal is expected.

The gain is then reduced to ($g_2$) in order to reduce the amplitude of the reflections from the surface and from the bottom in shallow water. After the surface reflection has been received the gain is again increased to $g_1$ with a time constant $\tau$.

For optimum detection of the reflection from the bottom and the noise level should be constant over the whole time that bottom signals are expected. The threshold for detecting the bottom reflection can then be set at a fixed level above the noise.

Figure 8:
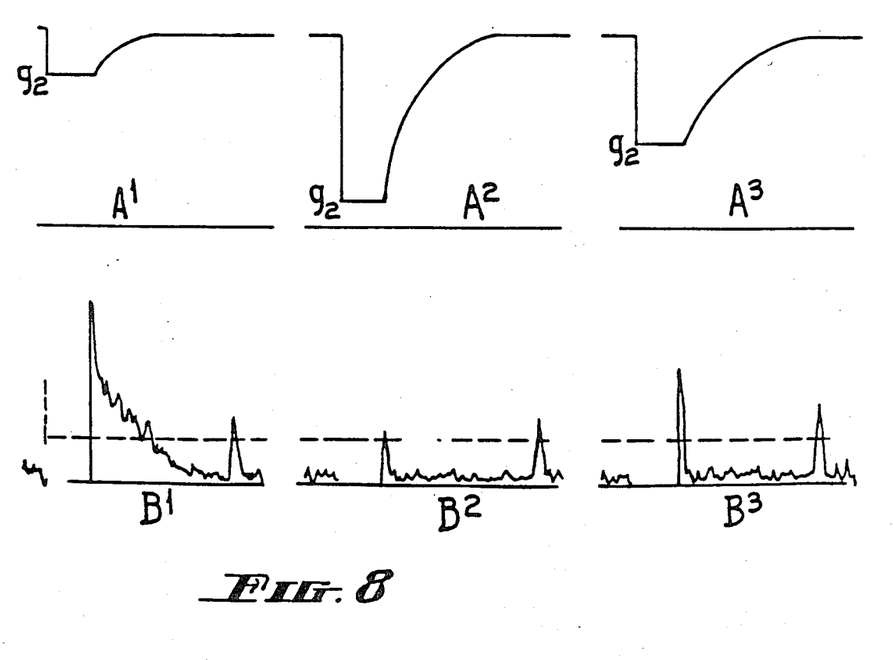
FIG. 8 shows how $g_2$ has a critical value, $A^1$ showing conditions when too high, $A^2$ showing it too low, and $A^3$ showing the optimum condition. $B^1$, $B^2$ and $B^3$ show the signals resulting under those conditions.

FIG. 8 shows the influence of $g_2$ on the noise profile. If $g_2$ is too high as shown at $A^1-B^1$ the backscatter from the water produces a larger signal that prevents the use of a constant threshold. If $g_2$ is too low as shown at $A^2-B^2$, noise is suppressed and a small bottom signal might also be supressed and remain undetected. The optimum value of $g_2$ produces a constant noise level. This is shown at $A^3-B^3$; $B^1$, $B^2$ and $B^3$ show respectively "false depth", "bottom undetected" and "true bottom".

Figure 9:
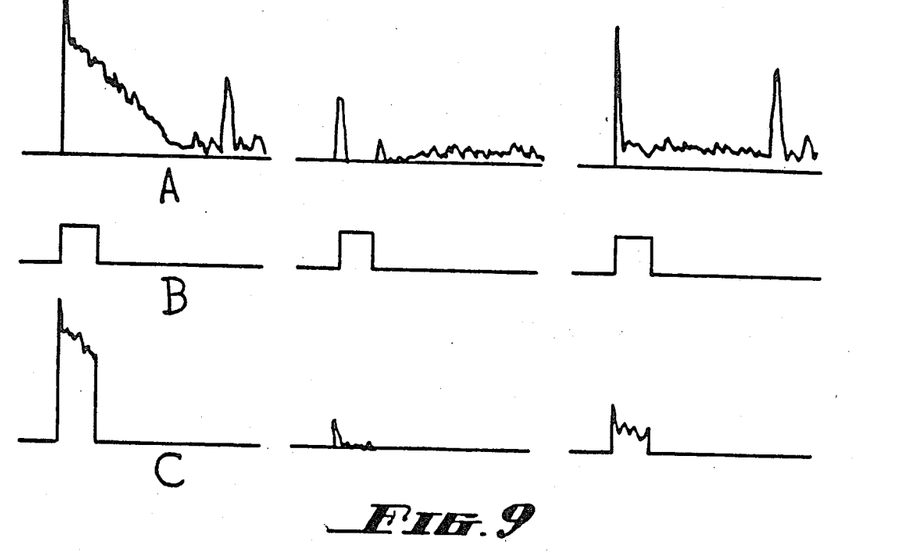
FIG. 9 shows examples giving A, return signal, B sample period and C sampled backscatter amplitude, the three consecutive conditions again showing conditions when "too high", "too low" and "optimum"

The value of the shallow water gain ($g_2$) will be controlled so that the amplitude of the backscatter noise signal from shallow water is equal to the background noise signal in deep water. This will be achieved by sampling the amplitude of the backscatter signal from the water within a few meters of the surface and controlling $g_2$ and $\tau$ to keep the backscatter amplitude constant. This is illustrated in FIG. 9, where A shows the return signal, B the sample period, and C the sampled backscatter amplitude reading from left to right "too large" "too small" and "optimum".

The sample period will be variable but initially it will correspond to water depths between one and two meters. Sampling cannot occur too close to the water surface otherwise surface reflections and small variations in the timing could introduce errors. Similarly sampling cannot continue too deep otherwise bottom reflections in shallow water would distort the measurement.

Figure 10:
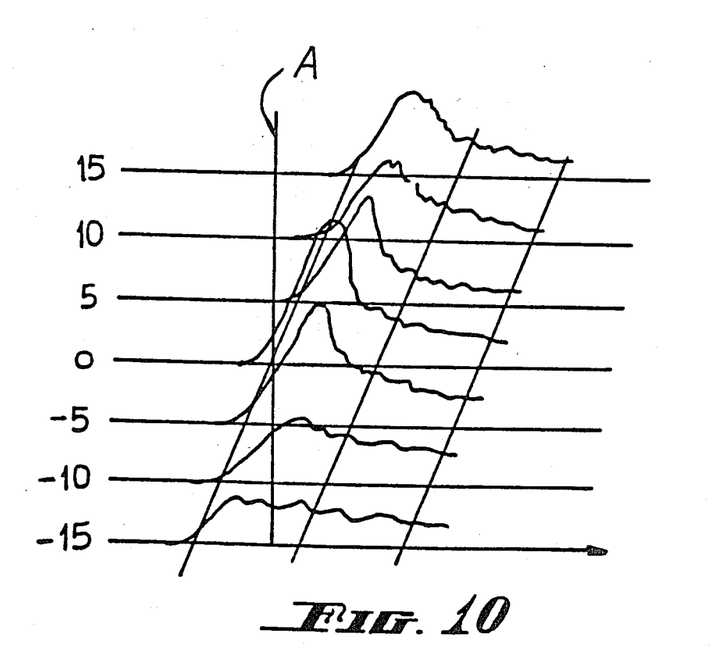
FIG. 10 shows the effect on return signals due to scan angle errors.
Figure 11:
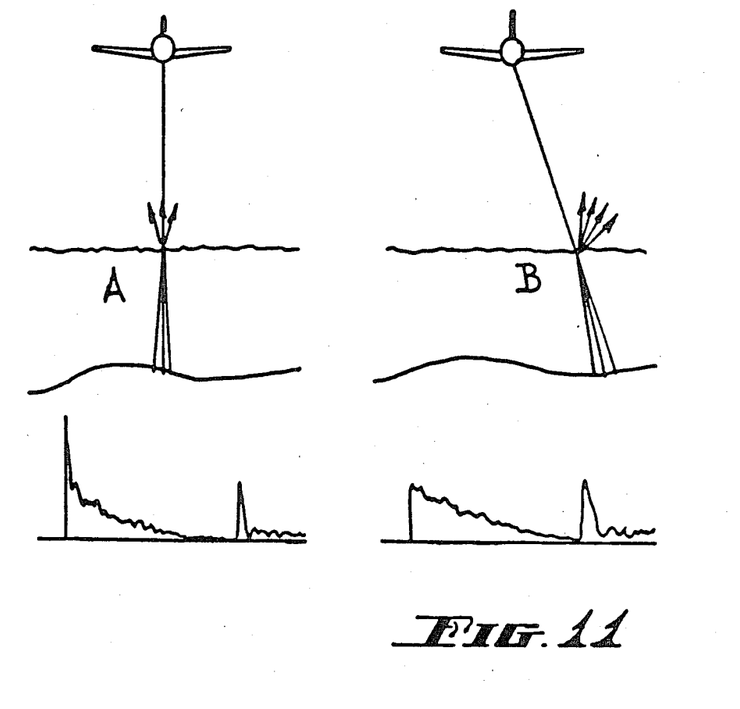
FIG. 11 shows at A the laser beam geometry of a vertical beam and at B for an inclined beam, showing below the typical return signal.
Figure 12:
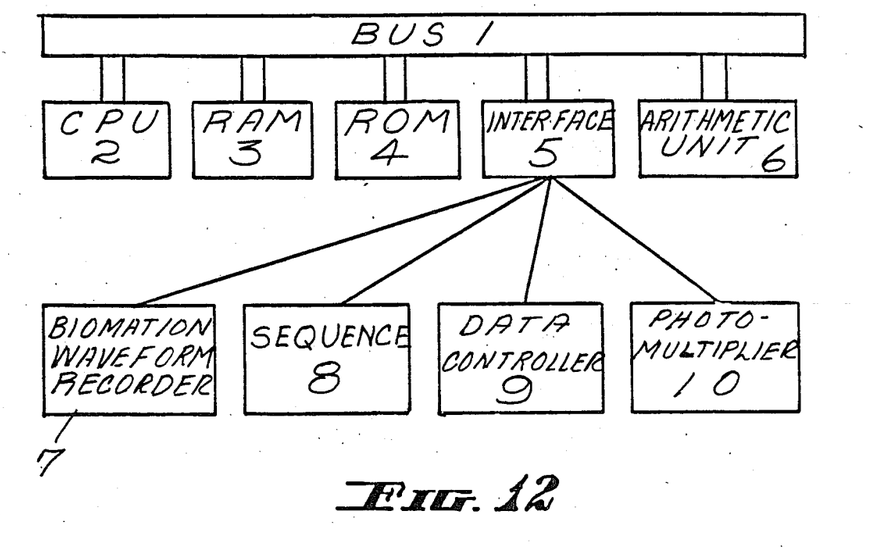
FIG. 12 shows a selection of pulses for determination of scan angle error, showing A an invalid condition because $g_2$ is too high, B a valid condition, and C an invalid condition because $g_2$ is too low.

The laser beam is scanned from side to side by a scanning mirror mounted on a roll stabilized platform. The time at which the surface reflection is received depends on the scan angle and timing errors result from any roll errors in the stabilized platform. Because the sampling interval for determining backscatter must be accurately related to the water surface, the dependence of the time of the surface reflection on scan angle must first be established experimentally. For a given roll angle error, the time error is proportional to scan angle as shown in FIG. 10 which shows the scan angles in degrees against time. The surface expected is designated A.

The transverse scanning of the laser beam provides an important aid to the determination of backscatter amplitudes. When the laser beam is vertical as at A in FIG. 11 there is a large probability that a strong reflection from the surface will be detected. On the other hand, when the beam is inclined at an angle as at B in FIG. 11 a reflection from the surface is less likely to be detected as illustrated in the lower part of FIG. 11. Thus, accurate sampling of the backscatter amplitude can be enhanced by ignoring all pulses exhibiting a strong surface reflection and averaging the remainder to determine the mean backscatter amplitude and transverse gradient for each transverse scan.

The parameter averaged will be a measure of water turbidity rather than system gain because it is water turbidity that determines the amplitude of the backscatter envelope. It is assumed that the water turbidity changes sufficiently slowly over the 270 meter scan width that it can be adequately described by a mean value and a transverse gradient.

A second averaging process will calculate a mean turbidity and turbidity gradient along the flight path of the aircraft. These parameters will then be used to predict the mean turbidity and transverse gradient along the next transverse scan.

From those values will be calculated the required values of the shallow water gain $g_2$ and the time constant $\tau$.

The theoretical considerations are as follows:

The main assumption, on which this invention is based, is that water turbidity changes relatively slowly with position. Specifically, it is assumed that the turbidity along a scan about 270 m wide can be predicted from measured values of turbidity over and adjacent 270 m square. Measurements of the beam attenuation coefficient in South Australian and Queensland coastal waters show changes of less than 20% over distances of this order. It is assumed, therefore, that the attenuation coefficient can be adequately represented by a linear function of position.

The laser power P entering the receiver at a time t after the light reflected from the surface is given by $$P(t) \alpha Ub \exp(-2kct/n)/h^2 \sec^2\phi,$$

where U is the energy in the transmitted pulse, b will be called the backscatter coefficient and is a measure of the magnitude of backscatter in the water, h is the aircraft height, and $\phi$ is the nadir angle of the laser beam. The exponential term, which describes the attenuation of the backscatter signal with depth, depends on the diffuse attenuation coefficient k, the speed of light in vacuum c and the refractive index of sea water n. The factor 2 accounts for the attenuation of the light on both downward and upward paths. Over the small scan angles used ($\pm 15°$) the approximation $\cos^2\phi - 1 - \phi^2$ where $\phi$ is in radians, is accurate enough and the total correction for angle is always less than 7%. The attenuation coefficient k is related to the backscatter coefficient b. An empirical relationship of the form $$k(b) = k_o + k_1 b$$

will be investigated when the necessary data becomes available.

The anode current of the photomultiplier is given by $$I(t) \alpha g(t) P(t),$$

where g(t) is the time variable gain of the tube. The variable gain is achieved by changing the photomultiplier voltage $V_p$ and the voltage $V_d$ applied to two pairs of dynodes. The empirical relationship $$g = g_o V_p^{12} \exp[-26000 (V_d/V_p)^2]$$

will be assumed, where $g_o$ is a constant. In this expression the $V_p^{12}$ term describes the overall gain of the photomultiplier with a linear dynode voltage divider. The exponential term gives the gain reduction due to the voltage applied to the controlled dynodes, where $V_d$ is the voltage deviation from the linear chain value. The dynode voltage decays from $V_2$ to $V_1$ with a time constant $\tau$, so that $$V_d(t) = V_1 - (V_1 - V_2) \exp(-t/\tau)$$

Using the above equations the backscatter coefficient can be derived from the photomultiplier current generated by backscatter from water just below the surface (i.e. $t \to 0$).

The expression is $$b = AI(o)h^2/(1-\phi)UV_p^{12} \exp[-26000(V_2/V_p)^2]$$

where A is a scaling constant.

When the average amplitude and transverse gradient of the backscatter is determined for each transverse scan, all pulses exhibiting a strong surface reflection will be excluded from the averaging. A selection process is now described.

Firstly, the backscatter amplitude will be sampled as close to the surface as possible after the surface reflection. Timing is therefore critical. Timing errors occur if the roll stabilisation of the laser transmitter is in error by a small amount, as illustrated in FIG. 10. To correct for this error a threshold ($L_1$) is set below the amplitude of the backscatter that would result when the system is operating correctly. The crossing of this threshold (at time $t_i$ for transverse position $x_i$) indicates the presence of the water surface. Invalid pulses, due to $g_2$ being too low (see FIG. 6), are excluded from the analysis. Invalid pulses, due to $g_2$ being too high, are prevented by limiting the maximum value of $g_2$.

The average surface position $\overline{S}$ and the transverse gradient $S'$ are then calculated by standard linear regression analysis, which yields $$S = [\Sigma x_i^2 \Sigma t_i - \Sigma x_i \Sigma x_i t_i]/D_s$$

$$S' = [n \Sigma x_i t_i - \Sigma x_i \Sigma t_i]/D_s$$

where $$D_s = n_s \Sigma x_i^2 - (\Sigma x_i)^2$$

and where $n_s$ is the number of valid pulses. If $n_s$ is too small for an acceptable analysis, $\overline{S}$ should be set to the value expected if the system operates perfectly and $S'$ should be set at zero.

When the average surface position has been determined in this way, it is possible to define a sampling interval for determining the backscatter that is less subject to timing errors. Small errors will remain, due to variation in wave height and to errors in the scan angle of the scanning mirror, but these should be small. A typical dependence of the sampling interval on scan angle is shown in FIG. 10.

A selection process is needed to exclude those pulses having a strong surface reflection. This is achieved by establishing a second threshold ($L_2$) and sampling interval corresponding to depths between 0 and 1 meter. Any pulses which exceed the $L_2$ threshold in this sampling interval are excluded.

The analysis will include all other pulses, even where the gain is too low to exceed threshold $L_1$. If the gain is too low, a low backscatter amplitude will be recorded and the servo system will increase the gain. On the other hand, if the gain is too high, so that even the backscatter amplitude exceeds $L_2$ and all the pulses are excluded, a "latch-up" could result. This would be prevented by setting the backscatter amplitude equal to $L_2$, in this case, so that the servo system would force the gain down again.

It will be assumed that the backscatter coefficient is a linear function of position along a scan, thus $$b(x) = b + b'x.$$

where x is the position along the scan (measured from a point directly below the laser transmitter in the starboard direction) and $\overline{b}$ and $b'$ are the mean and gradient of the coeffient along the transverse scan. Standard linear regression analysis yields $$b = (\Sigma x_i^2 \Sigma b_i - \Sigma x_i \Sigma x_i b_i)/D$$

$$b' = (n\Sigma x_i b_i - \Sigma x_i \Sigma b_i)/D$$

where $$D = n\Sigma x_i^2 - (\Sigma x_i)^2$$

and n is the number of valid measurements along the scan that are included in each summation.

The mean backscatter coefficient and its transverse gradient along the next scan, which will be designated $b_o$ and $b_o'$, can be predicted from the values of these parameters for the previous m scans. It can be shown that $$b_o = \Sigma a_j \bar{b}_j \text{ and } b_o' = \Sigma a_j b_j'$$

where $$a_j = n_j(\Sigma j^2 n_j - j\Sigma j n_j)/[\Sigma n_j \Sigma j^2 n_j - (\Sigma j n_j)^2]$$

and $\bar{b}_j, b_j'$, and $n_j$ are the values of $\bar{b}$, $b'$ and n for the jth scan prior to the one being predicted.

The gain settings for the next scan can then be calculated from an inversion of equation. This yields the ith value of $V_2$ along the next scan, namely $$V_{2i} = V_p\{\ln[(1-\phi_1)^2 U_i(b_o + b_o' x_i)V_p^{1-2}/AI_n \cdot h^2]/26000\}^{\frac{1}{2}}$$

where $I_n$ is the desired noise level, and $\phi_i$, $V_i$, and $x_i$ are the scan angle, transmitted pulse energy, and scan number of the ith pulse in the next scan.

The time constant $\tau$ may be fixed by requiring the anode current to be the same at time $\tau$ as it is initially. This requires $$g(\tau)P(\tau) = 1,$$

which reduces to $$\tau_i = \frac{n}{2k_i c} \frac{26000}{V_p^2} \{V_{2i}^2 - [V_1 - (V_1 - V_{2i})e^{-1}]^2\}$$

Figure 13:
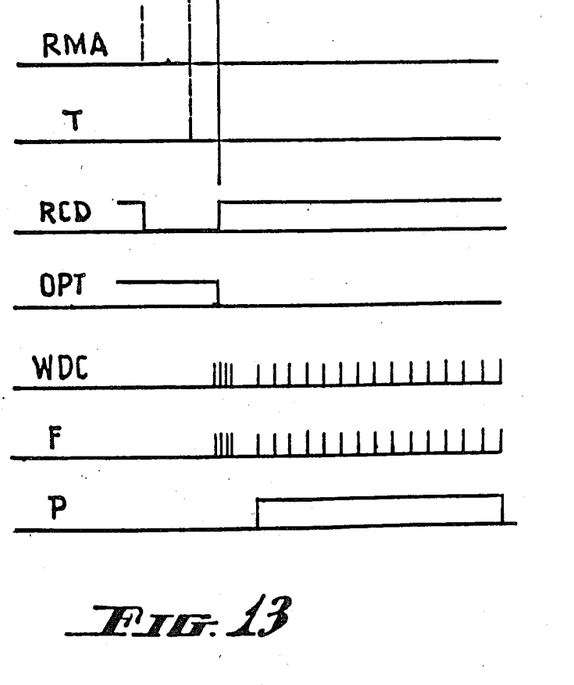
FIG. 13 is a schematic diagram of the photomultiplier gain controller.

A schematic diagram of microprocessor based photomultiplier gain controller is shown in FIG. 13.

In this 1 represents BUS, 2 to 6 represent respectively CPU, RAM, ROM, INTERFACE, and ARITHMETIC. 7 to 10 represent respectively the BIOMATION WAVEFORM RECORDER, the SEQUENCER, the DATA CONTROLLER, and the PHOTOMULTIPLIER.

Figure 14:
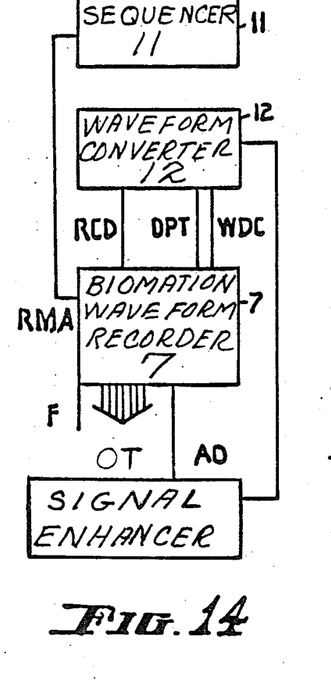
FIG. 14 is a schematic diagram of the Biomation waveform recorder and associated timing signals.

The Biomation waveform recorder supplies the return signals to be processed by the gain controller in the form of 6 bit parallel output. A schematic diagram of the system and the associated timing signals are shown in FIG. 14. In this 11, 12 and 13 represent the SEQUENCER, the WAVEFORM CONVERTER, and the SIGNAL ENHANCER, the BIOMATION WAVEFORM RECORDER being 7 as in FIG. 13. AO is the analogue output and OT the output. When the recorder receives the arm pulse (RMA) from the sequencer it starts recording the photomultiplier signal. It stops recording 2 μs after receiving a trigger T from the infrared surface pulse. The waveform converter then supplies an output signal OPT which allows the recorded waveform to be clocked out at a rate controlled by the word command signal WDC. The words initially clocked out at the 1.4 MHz rate correct timing errors associated with slant heights and should be ignored. The data to be analysed is available on the 6 bit parallel output when the flag F is set and the pedestal P is present.

The sequencer provides timing pulses for the system, including the 168 Hz laser pulse rate and the 50 kHz clock rate.

Data required for calculations, such as transmitted laser pulse energy and aircraft height, will be supplied by the data controller on an 8 bit parallel interface with handshake control. Values of the mean and transverse gradient of the backscatter coefficient ($\bar{b}$ and $b'$) for each scan will need to be sent to the data controller on the parallel interface for recording on magnetic tape.

The two controls that need to be supplied to the photomultiplier are grid voltage $V_2$ and the time constant $\tau$. The grid voltage is required as an analogue voltage. The time constant is controlled by switching two capacitors with relays. It is envisaged that the number of capacitors will be increased to four, in a binary sequence of values, to provide 16 combinations. The interface should provide the necessary levels for 4 parallel lines.

We claim:

1. The method of ocean depth sounding from the air by laser beam which comprises the following steps:
    (a) directing two laser beams of different wavelengths downwardly from an aircraft, one a beam in the green spectrum traversed laterally across the flight path of the aircraft to detect the ocean bottom, the other a vertical stable beam in the infrared spectrum to detect the ocean surface
    (b) receiving the reflected infrared surface signal and the reflected green ocean bottom signal in separate receivers,
    (c) processing the data from the red beam reflections to determine ocean surface distance and to generate a timing datum for depth measurement,
    (d) adjusting the dynamic range of the green receiver, for optimum reception of the bottom return signal which decreases exponentially in amplitude with increasing depth, and
    (e) processing the data from the green beam to determine the ocean depth by measuring the differential time between the two reflected signals.

2. The method of ocean depth measurement according to claim 1 wherein the depth measurement is effected by the steps of first determining the level of background energy entering the said receiver, adjusting the gain of the said receiver to compensate for background noise, triggering the said laser after the said gain has been adjusted, further adjusting the gain of the said amplifier when the green reflected signal is received to reduce the dynamic range of the signal to optimise the detection of the bottom signal, and sampling the signal at a time interval for a selected duration to record the signal and permit later detection of the bottom signal.

3. The method of claim 2 which comprises storing the received data in a memory and using a microprocessor to control the transfer of data to a recorder; the microprocessor in so doing compensates for the delay in the green reflected signal due to the slant path length, characterised by the step of adjusting the timing of the green beam to compensate for additional airpath traversed by the scanned component of the green laser beam according to the formula $H(\sec\phi_B - 1)$ where H is the height of the aircraft above the ocean surface and $\phi_B$ is the absolute inclination of the laser beam.

4. The method of ocean depth measurement according to claim 2 characterised by the step of controlling the gain of the said photomultiplier so that the amplitude of the backreflected noise signal from shallow water is comparable with noise signal due to sunlight reflected from the sea surface.

5. The method of ocean depth measurement according to claim 1 or 2 characterised by the step of determining the backreflection of the green beam, and applying the resultant signal to effect amplifier gain control.

6. The method of ocean depth measurement according to claim 1 or 2 wherein the said laser (preferably a Nd:YAG laser) is selected to provide a beam in the infrared wavelength and by the step of frequency doubling to produce a beam in the green wavelength, and using the said green beam for the ocean bottom depth determination and the residual infrared component for ocean surface determination.

7. The method of ocean depth measurement according to claim 1 using a telescope for receiving the reflected signals and attenuating the direct surface reflections in the green-receiving telescope by use of preselectable field stops, and passing the received signal through an interference type filter centered on the green signal wavelength.

8. The method of ocean depth sounding according to claim 2 wherein the gain is adjusted of a photomultiplier which incorporates a control grid, and regulating the control grid to actuate the tube only from the time of transmission until the return signals have been received.

9. The method of ocean depth sounding according to claim 1 using a pair of telescopes to pass the signal to receivers, one for each beam, measuring the background radiation received by the green receiver and using it to set the green receiver to deep water gain, using a photomultiplier gain control to reduce the green receiver gain to that required for shallow water signals, firing the laser to produce infrared and green beams and starting a time interval meter to count up a selected oscillator frequency and count down slant height, separating the infrared and green pulses, causing the green receiver gain to increase as surface reflection enters, triggering a waveform recorder and increasing green gain to reach required deep water gain, feeding received green signal from ocean to said waveform recorder, causing the waveform recorder replay under control of a waveform converter, filtering replayed green signal and using a counter to measure ocean depth.

10. The method of ocean depth sounding according to claim 9 wherein the sequence defined is regularly repeated as the green beam traverses the ocean both forwardly and laterally to give a pulsed wide-path ocean scan.

11. Apparatus for ocean depth sounding from the air by laser beam carried by an aircraft along a defined path, comprising:
(a) means to produce a laser beam in the infrared wavelength and a beam in the green wavelenth,
(b) means to direct the infrared beam normal to the surface of the ocean in stable condition to reflect from the ocean surface,
(c) means to direct the green beam to traverse laterally across the said path to reflect in part from the ocean surface and the ocean bottom,
(d) means to separately receive the reflected signal from the two beams to identify ocean bottom reflections and surface reflections,
(e) means to determine the background energy from the ocean surface and to adjust the gain of photomultiplier to which the return laser signals are fed,
(f) means to process the data from the infrared beam to generate a timing datum for ocean depth measurement by the green laser beam and to adjust the gain of the said photomultiplier to reduce the dynamic range of the signal to optimise detection of the bottom, and
(g) means to determine the elapsed time between the reflection from the ocean surface and the reflection from the ocean bottom and to calculate ocean depth.

12. Apparatus for ocean depth sounding according to claim 11, characterised by means to repetitively fire the said laser to effect a series of lateral soundings by the said green beam as the air vehicle moves forwardly to give a wide-path scan.

13. Apparatus for ocean depth sounding according to claim 11 or 12 wherein said means to produce a laser beam in the infrared wavelength and a beam in the green wavelength comprises a laser for producing a primary beam in the infrared wavelength, and means for splitting said primary beam and doubling the frequency of a portion thereof to provide said green beam, said infrared beam being derived from a residual portion of the primary infrared beam.

14. Apparatus for ocean depth sounding according to claim 13 wherein the said laser includes a laser rod of about 3 mm diameter which is positioned in a cavity defined between a total mirror and an output mirror of about 90% transmission characteristic.

15. Apparatus for ocean depth sounding according to claim 11 or 12 wherein the infrared beam is projected normal to the ocean surface and wherein the green beam is directed generally on a plane parallel to the said infrared beam but is caused to swing with a transverse movement by being projected from a mirror mounted to move about two axes normal the one to the other by generators activated from a two-signal initiating generator through amplifiers.

16. Apparatus for ocean depth sounding according to claim 15 characterised by at least a transducer coupled to link the transverse movement of the said mirror to a compensating circuit arranged to correct for the additional airpath traversed by the scanned component of the green laser beam according to the formula $H(\sec\phi_B - 1)$ where H is the height of the aircraft above the ocean surface and $\phi_B$ is the absolute inclination of the laser beam.

17. Apparatus for ocean depth sounding according to claim 11 or 12 wherein a photomultiplier is arranged to detect the green reflected signal and is arranged to reduce the dynamic range of the said signal to optimise detection of the bottom, the said photomultiplier having gain control means arranged to that the gain is increased until the internal noise current reaches a predetermined level and is held level until about 3 $\mu$s before a return signal is expected whereupon the gain is reduced to reduce the amplitude of reflections from the surface and bottom in shallow water but when these are received the gain is increased at a rate to the predetermined deep water gain as limited by background sunlight, the rate of increase of gain being that necessary to compensate for the rate of signal attenuation with depth.

18. Apparatus according to claim 11 wherein the said laser operates in the infrared wavelength and is frequency multiplied to produce two beams, one in the green wavelength and the other in the infrared wavelength, a coupler arranged to divide the said beams, means to transmit the said infrared beam to the ocean surface normal to the said surface, a telescope and detector means to receive radiation from the said infrared beam backreflected from the ocean surface, means to transmit the said green beam to the ocean floor, a telescope and photomultiplier means to receive radiation from the said green beam backreflected from the ocean floor, and a mirror in the path of the said green beam mounted to be oscillatable about the axis of flight of the aircraft.

19. Apparatus according to claim 18 wherein the said telescope for the green beam has a field of view substantially larger than the green beam at the ocean surface to receive the backreflected energy from the sea bottom.

20. Apparatus according to claim 18 wherein the received signal from the infrared backreflected beam is amplified and fed to an aircraft height counter and to a waveform recorder, and the received signal from the backreflected green beam is also fed to the waveform recorder, a signal enhancer and depth counter being connected to receive the signals from the said waveform recorder, and wherein a photomultiplier gain controller is connected to also receive the signal from the said waveform recorder and is arranged to control the output amplitude of the said green receiver.

21. Apparatus according to claim 20 characterised by means to store the signal in a memory in the said waveform recorder and by a microprocessor to control the replay from memory so as to compensate for the extra path travelled by the green beam compared to that travelled by the infrared beam.

22. An apparatus according to claim 13 wherein said laser is a Nd:YAG laser.

* * * * *